(12) United States Patent
Xu et al.

(10) Patent No.: US 9,906,580 B2
(45) Date of Patent: Feb. 27, 2018

(54) METHOD AND APPARATUS FOR GENERATING AND REPRODUCING ADAPTIVE STREAM BASED ON FILE FORMAT, AND RECORDING MEDIUM THEREOF

(71) Applicant: Samsung Electronics Co., Ltd., Gyeonggi-do (KR)

(72) Inventors: Yiling Xu, Gyeonggi-do (KR); Sung-Ryeul Rhyu, Gyeonggi-do (KR); Guanhua Zhang, Gyeonggi-do (KR); Jae-Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/095,325

(22) Filed: Dec. 3, 2013

(65) Prior Publication Data

US 2014/0095672 A1   Apr. 3, 2014

Related U.S. Application Data

(63) Continuation of application No. 13/041,975, filed on Mar. 7, 2011, now Pat. No. 8,626,870.

(30) Foreign Application Priority Data

Mar. 5, 2010 (KR) .................. 10-2010-0020148

(51) Int. Cl.
*G06F 15/16* (2006.01)
*H04L 29/08* (2006.01)
*H04N 21/854* (2011.01)

(52) U.S. Cl.
CPC ....... *H04L 67/06* (2013.01); *H04N 21/85406* (2013.01)

(58) Field of Classification Search
USPC ........................................ 709/217
See application file for complete search history.

(56) References Cited

U.S. PATENT DOCUMENTS

| 5,953,506 A | * | 9/1999 | Kalra et al. ............... 709/231 |
| 5,954,801 A | * | 9/1999 | Sokolov ............... G06F 3/0676 710/5 |
| 6,779,058 B2 | * | 8/2004 | Kishi ............... G06F 11/2074 707/999.202 |
| 7,305,421 B2 | * | 12/2007 | Cha ............... G06F 11/1471 |

(Continued)

FOREIGN PATENT DOCUMENTS

| CN | 101499918 | 8/2009 |
| EP | 1 845 690 | 10/2007 |

(Continued)

OTHER PUBLICATIONS

Impress Sakae Okubo, "Impress Standard Textbook Series Revision 3H.264/AVC Textbook", Japan, An Impress Group Company R&D, First Edition, Jan. 1, 2009.

(Continued)

*Primary Examiner* — Alicia Baturay
(74) *Attorney, Agent, or Firm* — The Farrell Law Firm, P.C.

(57) ABSTRACT

Methods and apparatus are provided for transmitting a file in a server. A file is generated for an adaptive stream service. The file is transmitted. The file includes range information for indicating a byte range of a segment.

4 Claims, 13 Drawing Sheets

(56) References Cited

U.S. PATENT DOCUMENTS

| | | | | |
|---|---|---|---|---|
| 8,015,491 | B2* | 9/2011 | Shaver | G06F 17/3089 715/716 |
| 8,074,043 | B1* | 12/2011 | Zeis | G06F 11/1453 711/162 |
| 8,205,004 | B1* | 6/2012 | Kaufman | H04L 65/607 375/240 |
| 8,244,901 | B2* | 8/2012 | Furbeck | G06F 17/30997 709/217 |
| 8,260,871 | B2* | 9/2012 | Fallen | G06F 11/0748 709/207 |
| 8,271,998 | B2* | 9/2012 | Dettori | G06F 8/24 709/201 |
| 8,332,404 | B2* | 12/2012 | Camble | G06F 17/30162 707/736 |
| 8,531,561 | B2 | 9/2013 | Shintani | |
| 2005/0102371 | A1* | 5/2005 | Aksu | H04L 29/06027 709/217 |
| 2005/0157599 | A1 | 7/2005 | Kiyama et al. | |
| 2005/0160177 | A1 | 7/2005 | Kim | |
| 2006/0206565 | A1 | 9/2006 | Ganesan et al. | |
| 2006/0212902 | A1 | 9/2006 | Seo et al. | |
| 2006/0274612 | A1 | 12/2006 | Kim | |
| 2007/0060136 | A1 | 3/2007 | Ramer et al. | |
| 2007/0074266 | A1 | 3/2007 | Raveendran et al. | |
| 2007/0192761 | A1* | 8/2007 | Sahita | G06F 21/53 717/140 |
| 2007/0209005 | A1 | 9/2007 | Shaver et al. | |
| 2007/0261092 | A1 | 11/2007 | Ozawa et al. | |
| 2008/0028170 | A1 | 1/2008 | Clinick et al. | |
| 2008/0091606 | A1* | 4/2008 | Grecia | G06Q 20/123 705/51 |
| 2008/0126517 | A1* | 5/2008 | Nakatsuka | H04L 67/16 709/219 |
| 2008/0163375 | A1* | 7/2008 | Savagaonkar | G06F 21/64 726/26 |
| 2008/0320100 | A1* | 12/2008 | Batson | G06F 17/30017 709/217 |
| 2009/0138579 | A1* | 5/2009 | Jung | H04L 41/0253 709/221 |
| 2009/0208119 | A1 | 8/2009 | Lee et al. | |
| 2011/0167345 | A1* | 7/2011 | Jones | H04N 21/44209 715/716 |
| 2011/0208829 | A1* | 8/2011 | Kwon | H04N 21/234327 709/217 |
| 2011/0219098 | A1 | 9/2011 | Xu et al. | |
| 2011/0246660 | A1* | 10/2011 | Bouazizi | H04L 65/4084 709/231 |
| 2012/0005303 | A1* | 1/2012 | Hwang | H04N 21/23614 709/217 |
| 2012/0011270 | A1* | 1/2012 | Priddle | H04L 65/605 709/231 |
| 2012/0259942 | A1* | 10/2012 | Brookins | H04L 67/28 709/213 |
| 2012/0259946 | A1* | 10/2012 | Stockhammer | H04L 65/105 709/217 |
| 2014/0380113 | A1 | 12/2014 | Luby et al. | |

FOREIGN PATENT DOCUMENTS

| | | | |
|---|---|---|---|
| JP | 3847751 | 11/2006 | |
| JP | 2007-523524 | 8/2007 | |
| JP | 2007295038 | 11/2007 | |
| JP | 2007-324722 | 12/2007 | |
| JP | 2008-533816 | 8/2008 | |
| JP | 2009-033760 | 2/2009 | |
| JP | 2009-510933 | 3/2009 | |
| JP | 2010016649 | 1/2010 | |
| JP | 2012-523747 | 10/2012 | |
| JP | 2013-505685 | 2/2013 | |
| KR | 1020040025994 | 3/2004 | |
| KR | 1020060067849 | 6/2006 | |
| WO | WO2005006330 | 1/2005 | |
| WO | WO 2005006330 A1 * | 1/2005 | ....... G06F 17/30244 |
| WO | WO 2009/002115 | 12/2008 | |
| WO | WO 2010/107627 | 9/2010 | |
| WO | WO2010117316 | 10/2010 | |
| WO | WO 2010117316 A1 * | 10/2010 | ............ H04L 29/06 |
| WO | WO 2011/044287 | 4/2011 | |

OTHER PUBLICATIONS

Takahiro Fukuhara et al., "JPEG2000 Detailed Description", First Edition, Sep. 15, 2004.

Satoshi Miyaji, "Cutting-edge Technology for Video Transmission on the Cellular Phone", The Journal of the Institute of Image Information and Television Engineers, vol. 59, No. 12, Dec. 1, 2005

Sadayasu Ono et al. "High-efficiency-coding of Ubiquitous Technology Video-MPEG-4andH.264", First Edition, Apr. 20, 2005.

Alex Zambelli, "IIS Smooth Streaming Technical Overview", Microsoft Silverlight, Windows Server, Internet Information Services 7.0, Mar. 2009.

Knowlton, C., Live Broadcasting with Silverlight and Windows Media, 2009, Microsoft, pp. 1-108.

Japanese Office Action dated Jun. 15, 2015 issued in counterpart application No. 2014-038058, 7 pages.

Korean Office Action dated Feb. 26, 2016 issued in counterpart application No. 10-2011-0020025, 10 pages.

European Search Report dated Jul. 13, 2016 issued in counterpart application No. 11750950.5-1908, 9 pages.

Korean Office Action dated Oct. 4, 2016 issued in counterpart application No. 10-2011-0020025, 6 pages.

Qualcomm Incorporated, "Updates to Adaptive HTTP Streaming", S4-100190, 3GPP TSG-SA4 Meeting #57, Jan. 25-29, 2010, 17 pages.

Qualcomm Europe S.A.R.L., "HTTP Streaming : Usage of 3GPP File Format", S4-090815, 3GPP TSG-SA4 #56, Nov. 9-13, 2009, 9 pages.

Chinese Office Action dated Mar. 9, 2017 issued in counterpart application No. 201410754248.7, 14 pages.

European Search Report dated Apr. 6, 2017 issued in counterpart application No. 11750950.5-1908, 7 pages.

* cited by examiner

METHOD AND APPARATUS FOR GENERATING AND REPRODUCING ADAPTIVE STREAM BASED ON FILE FORMAT, AND RECORDING MEDIUM THEREOF

PRIORITY

This application is a Continuation Application of U.S. application Ser. No. 13/041,975, filed on Mar. 7, 2011, which claims priority under 35 U.S.C. §119(a) to an application entitled "Method And Apparatus For Generating And Reproducing Adaptive Stream Based On File Format, And Recording Medium Thereof" filed in the Korean Intellectual Property Office on Mar. 5, 2010 and assigned Serial No. 10-2010-0020148, the entire contents of which are incorporated herein by reference.

BACKGROUND OF THE INVENTION

1. Field of the Invention

The present invention relates generally to a content transmission system, and, more particularly, to a method and an apparatus for generating and reproducing an adaptive stream based on a file format.

2. Description of the Related Art

International Organization for Standardization/International Electro-technical Commission (ISO/IEC) 14496-12 defines an ISO base file format as a standard file format used for a multimedia service. The ISO base file format has a flexible and extendable file structure and, thus, serves as a basis for various media file formats. The ISO base file format has a standardized file structure for packaging media resources and metadata and thus has an object-oriented design capable of including various types of media resources and metadata. For example, the Joint Photographic Experts Group (JPEG) 2000 and 3rd Generation Partnership Project (3GPP) file formats are based on the ISO base file format, and the Moving Picture Experts Group (MPEG)-4 file format also corresponds to an extension of the ISO base file format.

Meanwhile, the Audio/Video (A/V) streaming using HyperText Transfer Protocol (HTTP) corresponds to a streaming scheme, which minimizes the burden of the server and depends entirely on the intelligent processing of a client. The client achieves the streaming by using only a partial file transport request or a file transport request of the HTTP. Therefore, in order to adapt to data rate change of the network, files should be compressed at various data rates for the same content and should be previously uploaded in the server. Further, in order to adapt to a change of the network, the entire content file should be divided into proper-sized fragments and the divided fragments should be stored as files. Further, a separate metadata file containing information about a method of sequentially taking such fragmented files and reproducing A/V content from them should be uploaded in the server. An example of such a metadata file is Manifest, which implies, in general, a file providing information relating to a file list. A file used to transmit configuration information and additional information about files, such as time and bandwidth of data constituting content, when content information is transmitted, is referred to as a "Manifest file". Further, it is possible to previously transmit information relating to the file list to the client so that the client can select a file.

Further, the Manifest provides information on an adaptive stream. For example, the Manifest provides information on the bitrate used for each segment. Therefore, the terminal can choose a proper segment based on the information on the adaptive stream.

However, when content is transmitted after being divided into small units in order to adapt to a changing broadcast environment, a scheme for efficiently transferring the Manifest file is required. Further, a scheme by which a client can find a proper file for reproduction through a file format transmitted from a server, is also required. Additionally, at the time of scheduling in the server, files should be mapped to corresponding segments by referring to different Uniform Resource Locators (URLs), which increases the scheduling load.

SUMMARY OF THE INVENTION

Accordingly, the present invention has been made to solve the above-mentioned problems occurring in the prior art, and the present invention provides a method and an apparatus for generating and reproducing an adaptive stream based on a file format, which can efficiently transfer, receive, and reproduce Manifest information.

Further, the present invention provides a method and an apparatus for generating an adaptive stream based on a file format, which enables efficient scheduling by a server.

In accordance with an aspect of the present invention, a method is provided for transmitting a file in a server. A file is generated for an adaptive stream service. The file is transmitted. The file includes range information for indicating a byte range of a segment.

In accordance with another aspect of the present invention, an apparatus is provided for transmitting a file in a server. The apparatus includes a generator to generating a file for an adaptive stream service. The apparatus also includes a transmitter to transmitting the file. The file includes range information for indicating a byte range of a segment.

In accordance with another aspect of the present invention, a method is provided for reproducing a file in a server. A file is received for an adaptive stream service. The file is analyzed. Decoding is performed based on a result of analyzing of the file. The file includes range information for indicating a byte range of a segment.

In accordance with another aspect of the present invention, an apparatus is provided for reproducing a file in a server. The apparatus includes a receiver to receiving a file for an adaptive stream service. The apparatus also includes a parser to analyzing the file. The apparatus further includes a decoder to decoding based on a result of analyzing of the file. The file includes range information for indicating a byte range of a segment.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description, a detailed description of known functions and configurations incorporated herein will be omitted when it may make the subject matter of the present invention rather unclear. Further, in the following description of the present invention, various specific definitions are provided only to help general understanding of the present invention, and it is apparent to those skilled in the art that the present invention can be implemented without such definitions.

In the following description of the operations of servers and terminals, the process of generating and parsing the file format not described in detail follows the ISO/IEC 14496-12, to which the present invention is not limited.

Figure 1:
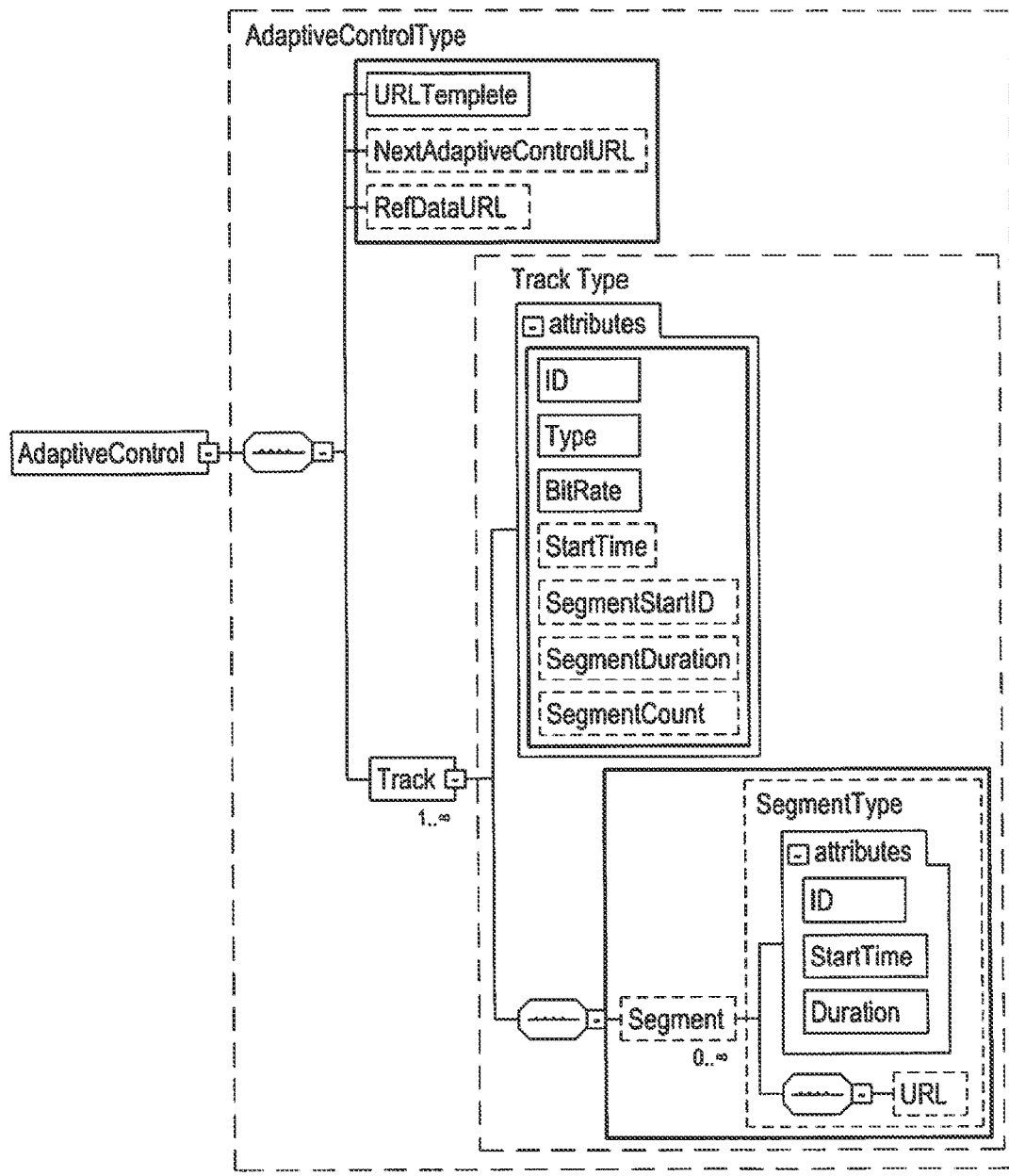
FIG. 1 illustrates a schema of a manifest of a current mechanism.
Figure 2:
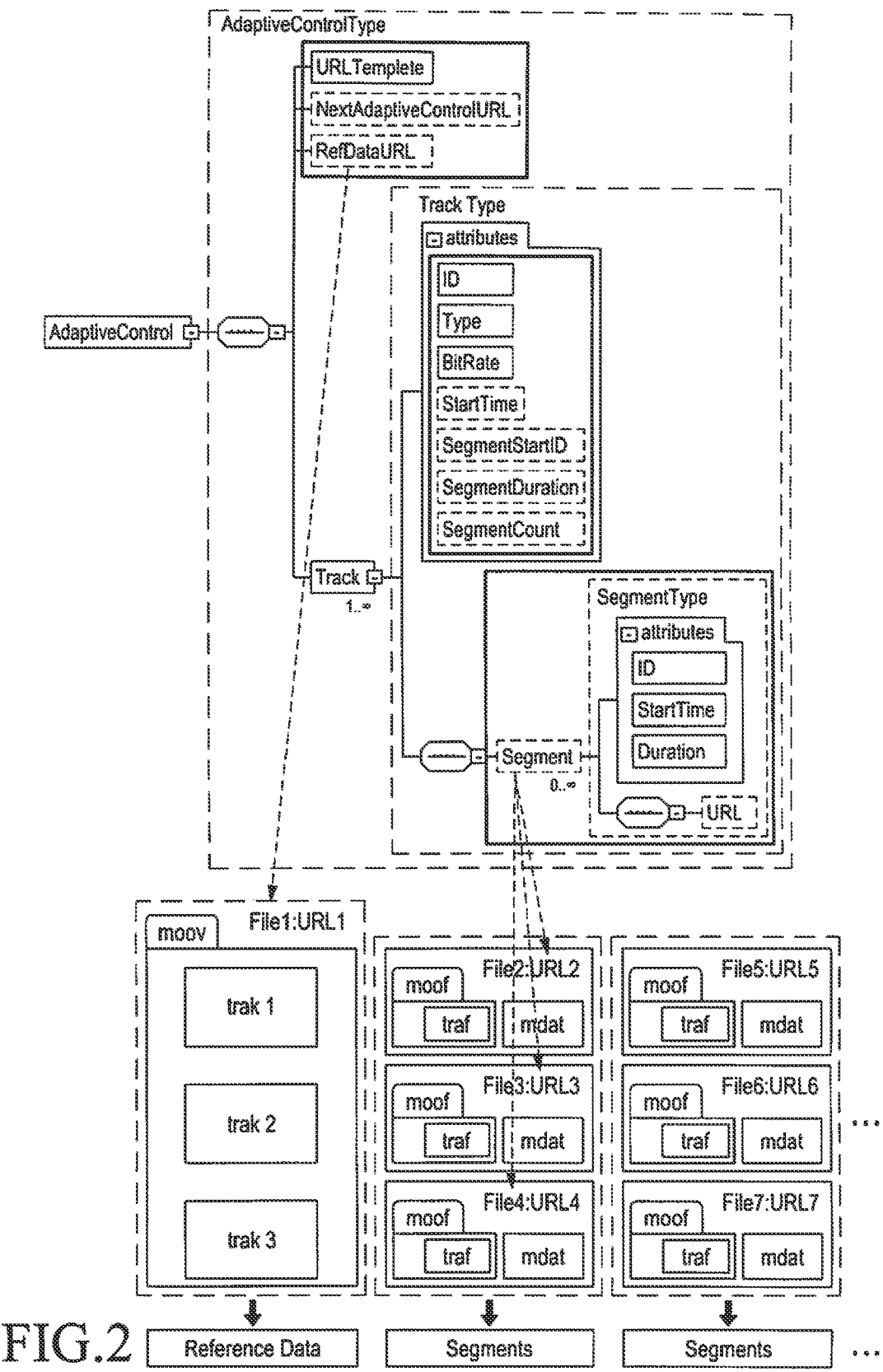
FIG. 2 illustrates a structure of a file format relating to the manifest shown in FIG. 1.

Manifest parameters include schema and attributes as shown in FIG. 1. FIG. 2 illustrates a structure of a file format relating to the Manifest shown in FIG. 1.

I. URLTemplate—corresponds to a unique URL created by combining fixed portions, which include a segment ID and a track ID. URLTemplate includes URLs of each segment along with track ID and segment ID. A URLTemplate indicates a template for accessing each segment. URLTemplate can be overridden by a URL in the segment if necessary. The following is an example of URLTemplate.

http://example.com/vod/movie/18888/Track/{TrackID}/Segments/{segmentID}

II. NextAdaptiveControlURL—used to indicate the next XML URL which is necessary for continuous viewing. NextAdaptiveControlURL is optional and can be used in a live adaptive streaming or for advertisement.

III. RefDataURL—used to indicate a part of or an entire head data (.ref). RefDataURL is optional when segments can decode themselves.

IV. Track—a set of contiguous segments of a particular type with different bitrates.
  i. ID—indicates a Track ID.
  ii. Types—indicates the type of Track. Types can be Video, Audio, Packed or combined Video and Audio, and I-Frame.
  iii. BitRate—indicates a bitrate of segments in Track.
  iv. StartTime—indicates a time stamp which specifies the start time of a track. StartTime is optional
  v. SegmentStartID—indicates the initial ID of segments which belong to the track. SegmentStartID is optional.
  vi. SegmentDuration—indicates the duration of each segment. SegmentDuration is optional.
  vii. SegmentCount—indicates the total number of segments which belong to the track. SegmentCount is optional.
  viii. Segment—is a concatenation of some basic units, each including a fragment made of only audio or video data or both audio and video data divided based on specific time interval. Segment is a basic unit of transfer between the server and the client. Segment is assigned a time stamp for temporal and spatial locating or A/V synchronization. (The element segment is optional. If the optional attributes of a track element are specified, all of the information of each segment can be deduced and the element segment becomes unnecessary.)
    ID—a segment ID.
    StartTime—indicates the starting time of the segment.
    Duration—indicates the duration of the segment.
    URL—URL is optional when URLTemplate is used. URL can be specified for special usage (e.g., content or advertisement video from another server) and the URLTemplate would be ignored for this segment.

The present invention includes the addition of changed elements into several file formats in order to efficiently transfer Manifest information within a file.

In the current mechanism as shown in FIG. 2, the manifest and data (e.g., audio, video) are separated. The terminal requests and acquires the manifest from the server. The terminal can then be aware of information about a head and each segment. The head information, which corresponds to information about decoding and composition, is stored in the moov box in the file format. The segment information is a part of the service data and includes a moof box and a media data (mdat) box.

The moof box stores information about this part of the service, and mdat box stores real data, for example, media stream or media data, such as video and audio. The example described in the current mechanism is based on the current file format. If the file format is modified in the future, the head and segment may also be mapped to the new format.

Currently, the manifest is not stored inside the file format, and the file format and the manifest are separately requested and sent to the terminal.

Head information and segments are divided into different files with different URLs. That is, different files have different URLs. Therefore, at the time of scheduling, the server should refer to different URLs in order to map each segment to each file, which increases the load of the scheduling.

The ISO-based media file format includes a plurality of boxes containing detailed information on audio/video data and audio/video. The box described herein can be also referred to as a data block or a container.

In the first to third embodiments of the present invention, the manifest is configured in a mani box within one file format.

Figure 3:
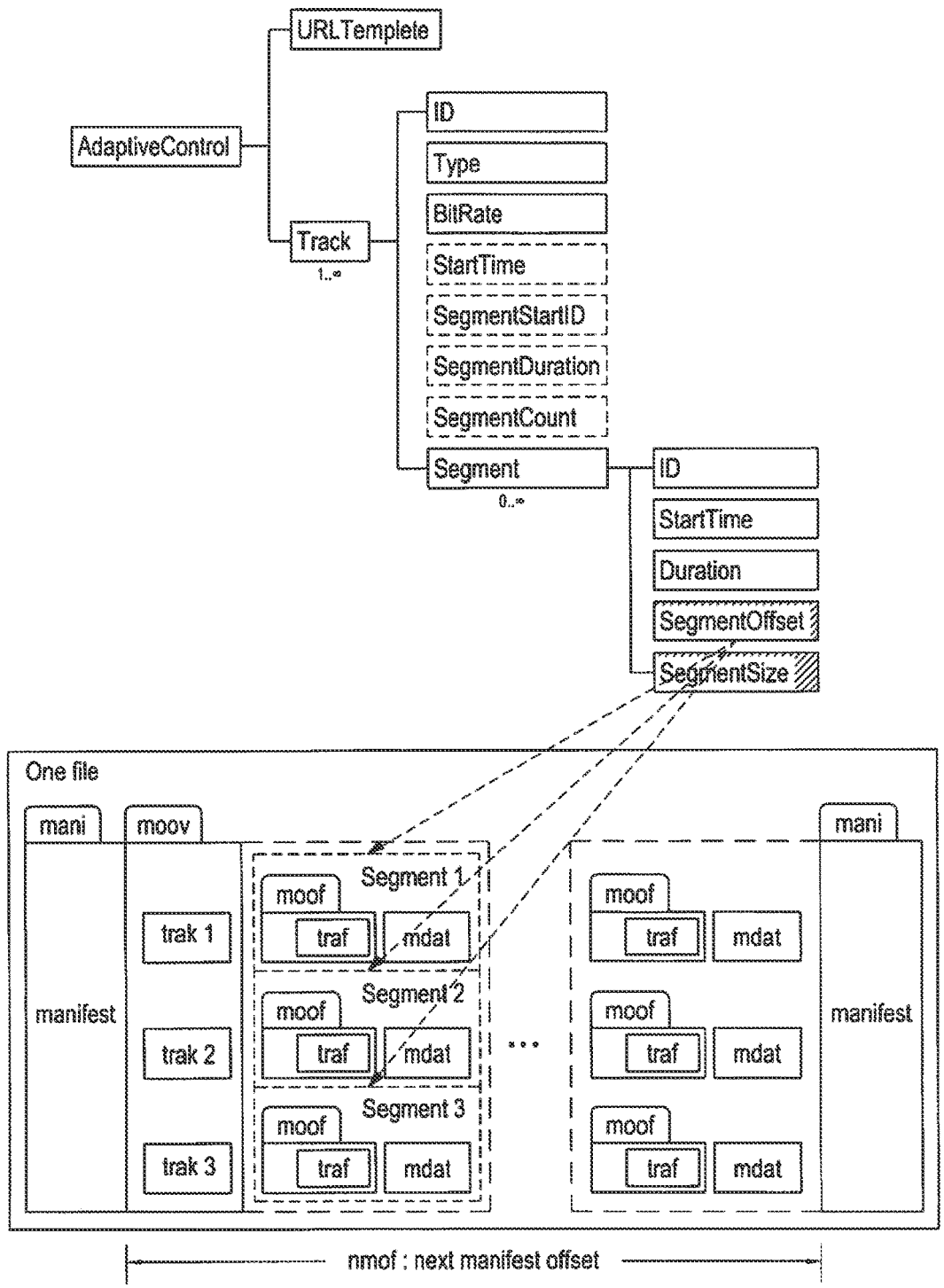
FIG. 3 illustrates a manifest configuration according to the first embodiment of the present invention.

FIG. 3 illustrates a manifest configuration according to the first embodiment of the present invention.

Manifest, head information, segments, and the next manifest are all included in one file. The manifest is stored in the mani box and the head information is stored in the moov box.

The SegmentOffset and SegmentSize attributes are defined in the manifest to signal the offset and size of each segment in the file. Thus, the terminal can request the server to provide an expected segment based on http range. Further, the URLTemplate attribute is created with a fixed part and range information. That is, it is possible to acquire each segment in the same URL based on the information of the SegmentOffset and SegmentSize attributes of the manifest.

Further, when the manifest box inside file format is defined, the NextAdaptiveControlURL attribute is not used. Since the next manifest is also stored in this file, i.e. within a single file, the offset of the next manifest is defined in the current manifest box.

Other parameters are the same as those of the current manifest.

Figure 4:
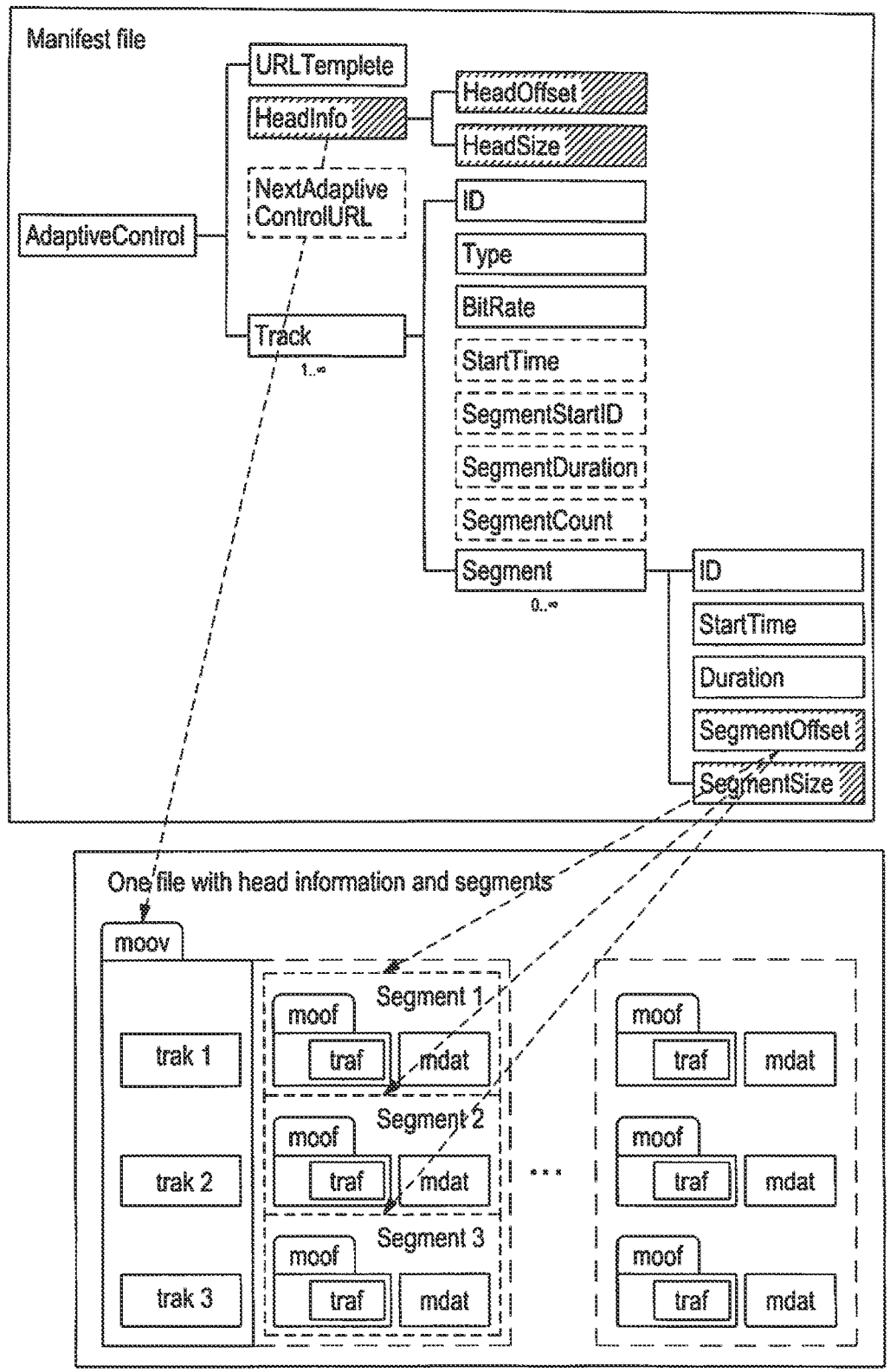
FIG. 4 illustrates a manifest configuration according to the second embodiment of the present invention.

FIG. 4 illustrates a manifest configuration according to the second embodiment of the present invention.

In the second embodiment of the present invention, head information and all segments are still in one file, but the manifest is delivered separately from the one file as shown in FIG. 4. The manifest can be stored by another single file or transmitted through a separate message other than the file structure, or can be acquired through a separate URL. That is, the manifest and a single file, including all segments, and head information are separately acquired by the terminal. The new mechanism according to the present embodiment has a construction similar to that of the current mechanism described above in with respect to FIG. 2 in that the single file includes all segments and head information without the manifest information. However, although head information and each segment should be accessed and acquired through different URLs in the current mechanism described above, the head information and all segments should be acquired through one URL in the second embodiment of the present invention. That is, in order to acquire all segments through one URL as described above, a new attribute, "Headinfo," for acquiring the location of head information within the manifest should be defined.

Therefore, since the head information is stored in the moov box, the Headinfo attribute contains the location of the moov box in the file. To this end, HeadInfo is defined with parameters including HeadOffset and HeadSize.

If head information and the remaining segments are divided into two files with different URLs, then RefDataURL could be used here to indicate the head information.

The SegmentOffset and SegmentSize attributes can be defined in the manifest in order to signal the offset and size of each segment in the file. Therefore, the terminal can request the expected segment based on an http range. Further, the URLTemplate attribute is created with a fixed part and range information.

In the second embodiment of the present invention, the manifest is received separately. Therefore, the mani box is not used, and the next manifest is indicated by the NextAaptiveControlURL attribute. That is, it is possible to interpret the next manifest information through the NextAaptiveControlURL attribute.

Figure 5:
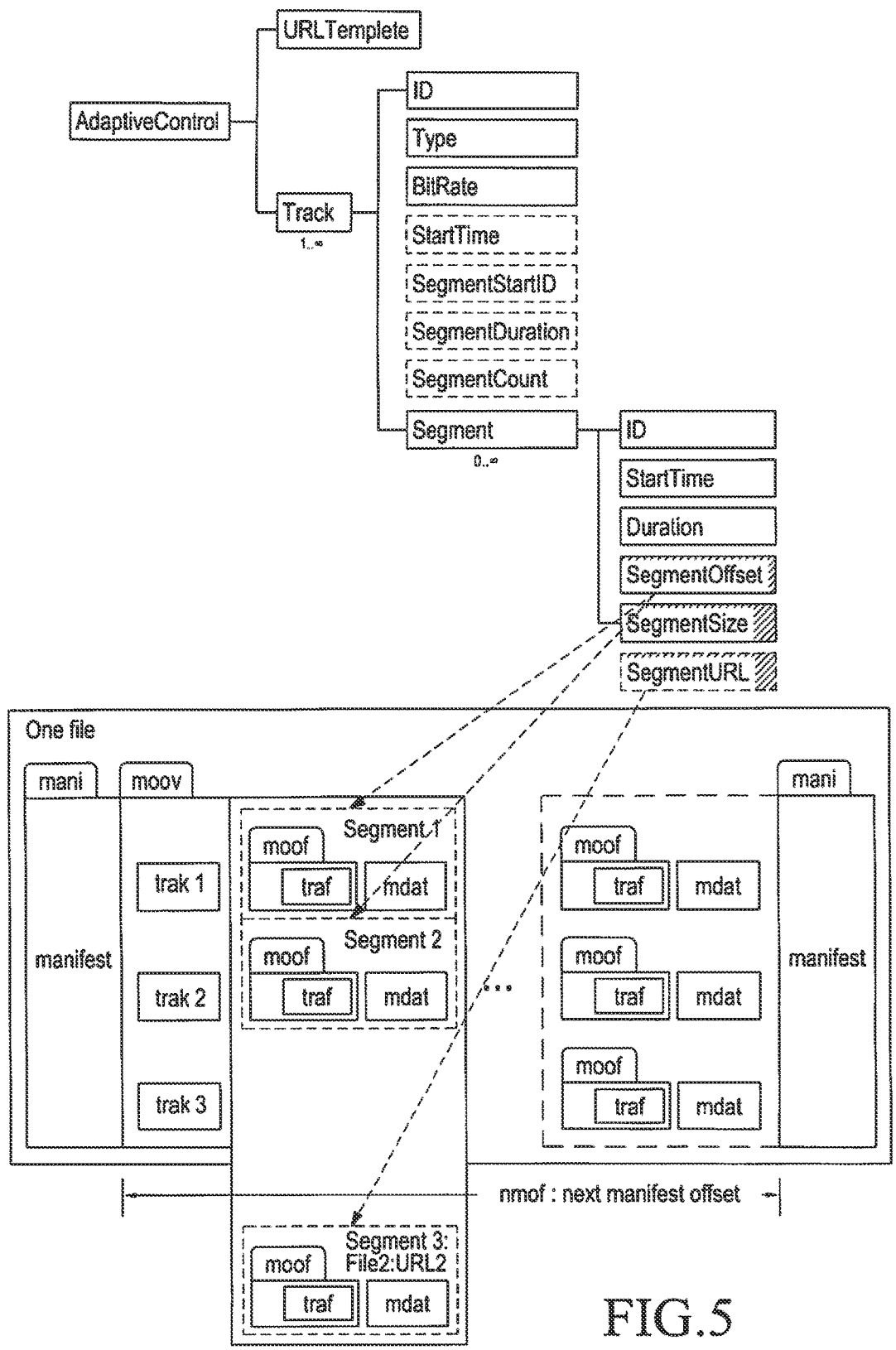
FIG. 5 illustrates a manifest configuration according to the third embodiment of the present invention.

FIG. 5 illustrates a manifest configuration according to the third embodiment of the present invention.

In this mechanism, some of the segments can be in one file (the main file), and others can be in another file (an auxiliary file). As shown in FIG. 5, segments #1 and #2 are in one file, and the SegmentOffset and SegmentSize attributes indicate locations of segments #1 and #2 within the one file. However, segment #3 is in another file, and the location of segment #3 is indicated by the SegmentURL attribute. For example, in a hybrid network, some segments can be taken from a file through a wired network, and some segments can be taken from a file through a wireless network. Therefore, in the case that a segment is stored in the main file, SegmentOffset and SegmentSize are used to indicate the segment location in the file. In the case that the segment is stored in another file (auxiliary file), SegmentURL is used to indicate the segment location.

The Manifest can be stored in the main file as in the example shown in FIG. 5 and can also be stored separately.

The location of the manifest in the file format can vary. Not only can the mani box be defined in the file level, but the mani box can also be located in another level. For example, the mani box can be located at the moov level.

Figure 6:
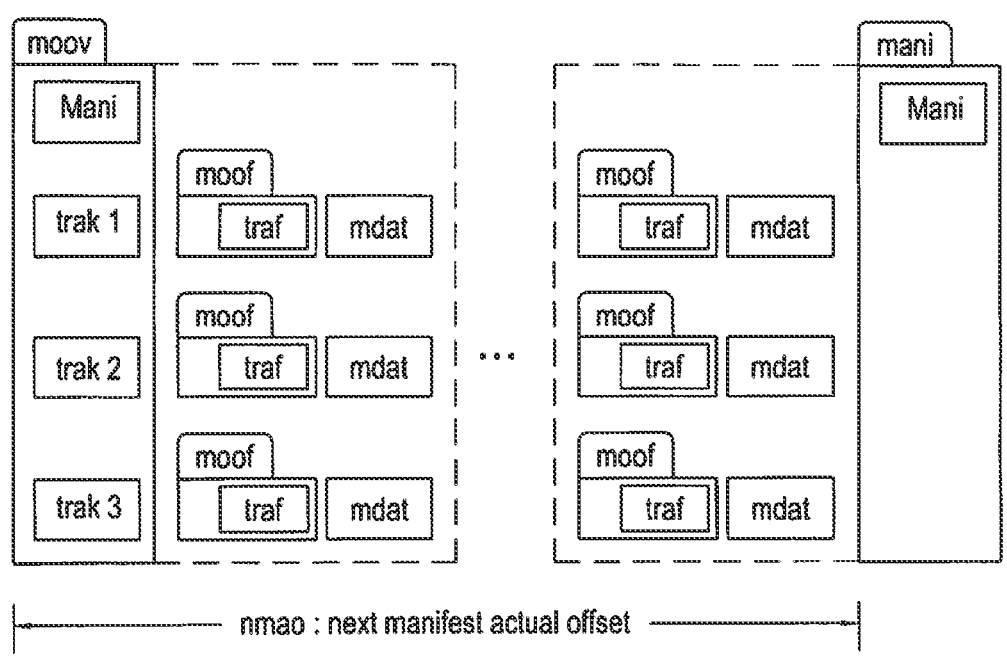
FIG. 6 illustrates the mani box located in the moov level or moov box according to the fourth embodiment of the present invention.

FIG. 6 illustrates the mani box located in the moov level or moov box according to the fourth embodiment of the present invention.

The description regarding the manifest box in the moov level is similar to the description about the manifest box in the file level or file box, that is, similar to the description in the first embodiment of the present invention.

In general, the moov box is not updated. However, the manifest update may be required, for example, in the case of a live stream. When a manifest update is required, the moov box should support an update mechanism and carry the next manifest box as shown in the following structure. In the first moov box, except for the normal track box, the mani box is added. When a new mani box is required, the moov box is updated to carry the new mani box. FIG. 6 illustrates a segment structure. The structure shown in FIG. 6 is based on, which will be described later. However, if the free space is used, the structure shown in FIG. 6 is based on the second case, which will be described later.

The location of the manifest in the file format can vary. Not only can the mani box be defined in the file level, but the mani box can also be located in another level. For example, the mani box can be located in the meta level.

Figure 7:
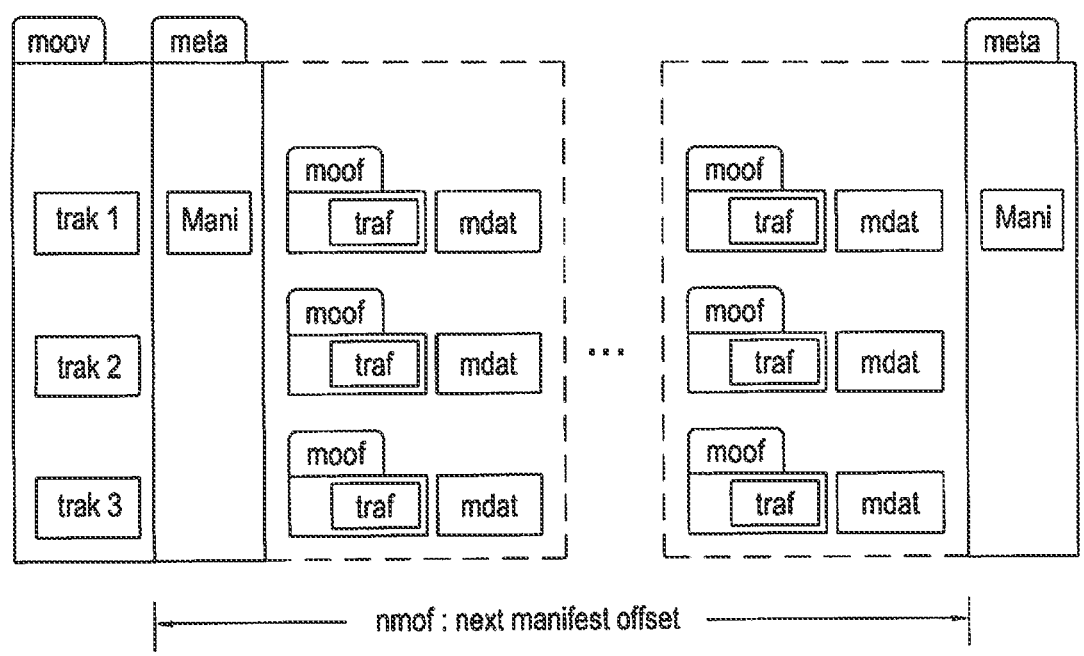
FIG. 7 illustrates the mani box located in the meta level or meta box according to the fifth embodiment of the present invention.

FIG. 7 illustrates the mani box located in the meta level or meta box according to the fifth embodiment of the present invention.

The description of the manifest box in the meta level is similar to the description of the manifest box in the file level or file box, that is, similar to the description in the first embodiment of the present invention.

In general, the meta box is not updated. However, the manifest update may be required, for example, in the case of a live stream. When the manifest update is required, the meta box should support an update mechanism and transmit the next manifest box. In the first meta box, except for the normal metadata information box, the mani box is added. When a new mani box is required, the meta box is updated to carry the new mani box. FIG. 7 illustrates a segment structure. The structure shown in FIG. 7 is based on the first case, which will be described later. However, if the free space is used, the structure shown in FIG. 7 is based on the second case, which will be described later.

In the new manifest configuration, a new mani box is proposed in order to support various embodiments described above. Various boxes may be included within the proposed mani box. The newly defined boxes are as shown in Table 1 below.

TABLE 1

| New Box | | Description |
| --- | --- | --- |
| mani | | For transmitting manifest information |
| | mahd | Manifest header, overall information |
| | mxml | Manifest XML container |

TABLE 1-continued

| New Box | | Description |
|---|---|---|
| | nmof | Next manifest offset |
| | nmsz | Next manifest size |

Hereinafter, the newly defined boxes in Table 1 will be described in detail.

2.1 mani box
Box Type: "mani"
Container: File
Quantity: zero or more

The mani box is used when the manifest is delivered within the file. In the case of Content on Delivery CoD, one file has one mani box. In the case of live adaptive streaming, there could be more than one mani box.
An example of the syntax is as follows.

```
aligned(8) class ManifestBox extends Box('mani'){
}
```

2.2 mahd
Box Type: "mahd"
Container: mani box
Quantity: exactly one

This box includes information about manifest, and an example of the syntax is as follows.

```
aligned(8) class ManifestHeaderBox extends FullBox('mahd', version, 0)
{
if (version = 1) {
    unsigned int(64) creation_time;
    unsigned int(64) modification_time;
    unsigned int(32) timescale;
    unsigned int(64) duration;
    unsigned int(64) size;
} else { // version==0
    unsigned int(32) creation_time;
    unsigned int(32) modification_time;
    unsigned int(32) timescale;
    unsigned int(32) duration;
    unsigned int(32) size;
    }
}
```

In the syntax, "version" is an integer that specifies the version of the manifest box, which can be expressed as 0 or 1 based on the current specification.

"creation_time" is an integer that declares the creation time of the presentation, in seconds past midnight, Jan. 1, 1904, Coordinated Universal Time (UTC).

"modification_time" is an integer that declares the most recent time the presentation was modified, in seconds past midnight, Jan. 1, 1904, in UTC time;

"timescale" is an integer that specifies the time-scale for the entire presentation, and corresponds to the number of time units that pass in one second, for example, a time coordinate system that measures time in one-sixtieths of one second has a time scale of 60);

"duration" is an integer that declares the length of the presentation in the indicated timescale, and this property is derived from the presentation's tracks (i.e., the value of this field corresponds to the duration of the longest track in the presentation.

"size" is an integer that specifies the number of bytes in this box.

2.3 mxml
Box Type: "mxml"
Container: mani box
Quantity: exactly one

This box (manifest MXML box) is a container for the manifest XML, and an example of the syntax is as follows.

```
aligned(8) class MXMLBox extends FullBox("mxml ", version = 0, 0) {
string xml;
}
```

2.4 nmof
Box Type: "nmof"
Container: mani box
Quantity: zero or one
This box (Next Manifest Offset box) is used when a next mani box is created in the file and indicates the offset value, and an example of the syntax is as follows.

```
aligned(8) class NextManifestOffsetBox
    extends FullBox("nmof", version = 0, 0) {
unsigned int(32) size;
}
```

2.5 nmsz
Box Type: "nmsz"
Container: mani box
Quantity: zero or one
This box (Next Manifest Size box) is used when a next mani box is created in the file and indicates the size of the next mani box, and an example of the syntax is as follows.

```
aligned(8) class NextManifestSizeBoxextends FullBox("nmof", version = 0, 0) {
unsigned int(32) next_manifest_offset;
}
```

Figure 8:
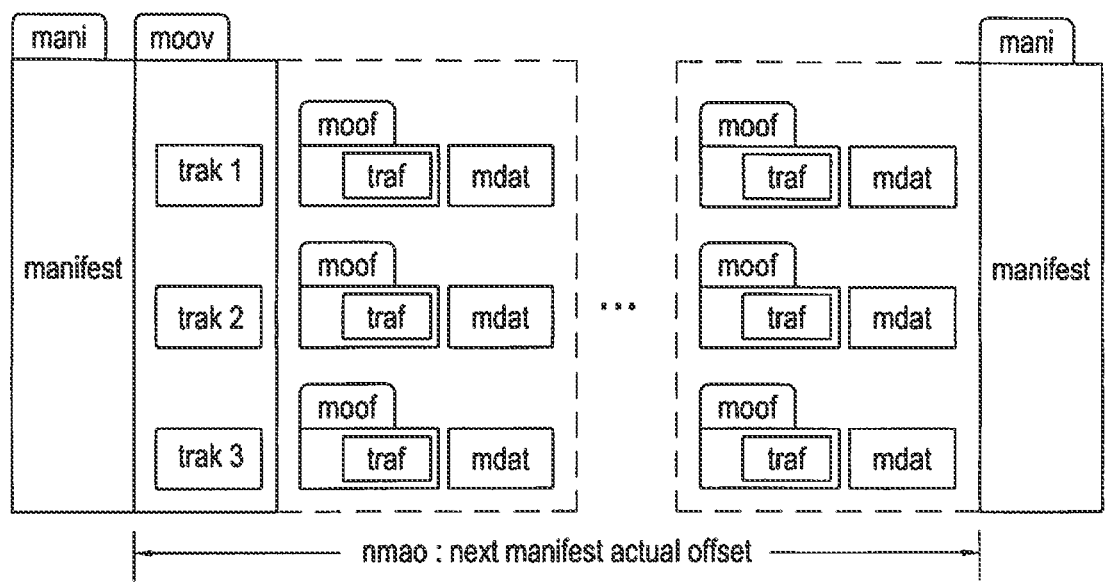
FIG. 8 illustrates an example of the segment structure according to the present invention.

The first case of the segment structure is shown in FIG. 8.

In the case of the live stream, when the manifest is created, the length of each segment may already be known. That is, next manifest actual offset (nmao) is determined in advance. Therefore, the exact offset and size of each segment is fixed, and the offset of the next manifest can be predicted.

Figure 9:
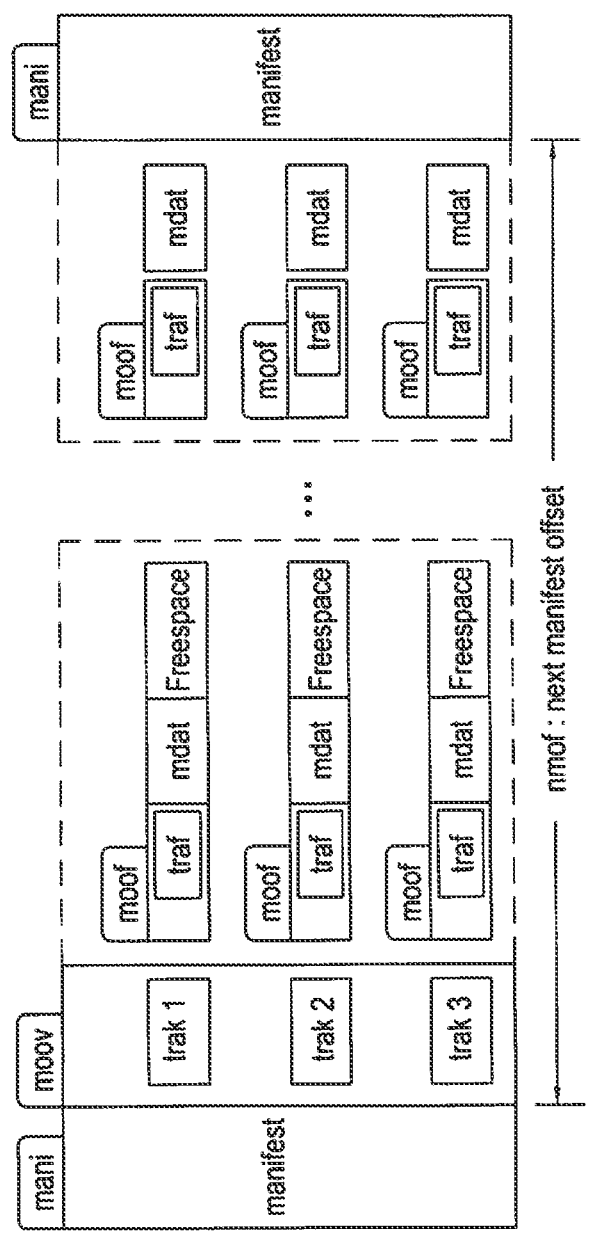
FIG. 9 illustrates another example of the segment structure according to the present invention.

The second case of the segment structure is shown in FIG. 9.

Case 2 of the segment structure additionally includes free space.

Under some conditions, when the manifest is created, the actual size of each segment is not known. In this case, it is possible to assume and assign a fixed size for each segment, and the fixed size should be large enough for each segment. Therefore, free space for carrying extra data are included in the media data box. If the segment does not use all the reserved space, the free space is used for the remaining size. Because the fixed size is reserved for all the segments, the offset of the next manifest can be known and indicated in the previous manifest box.

Figure 10:
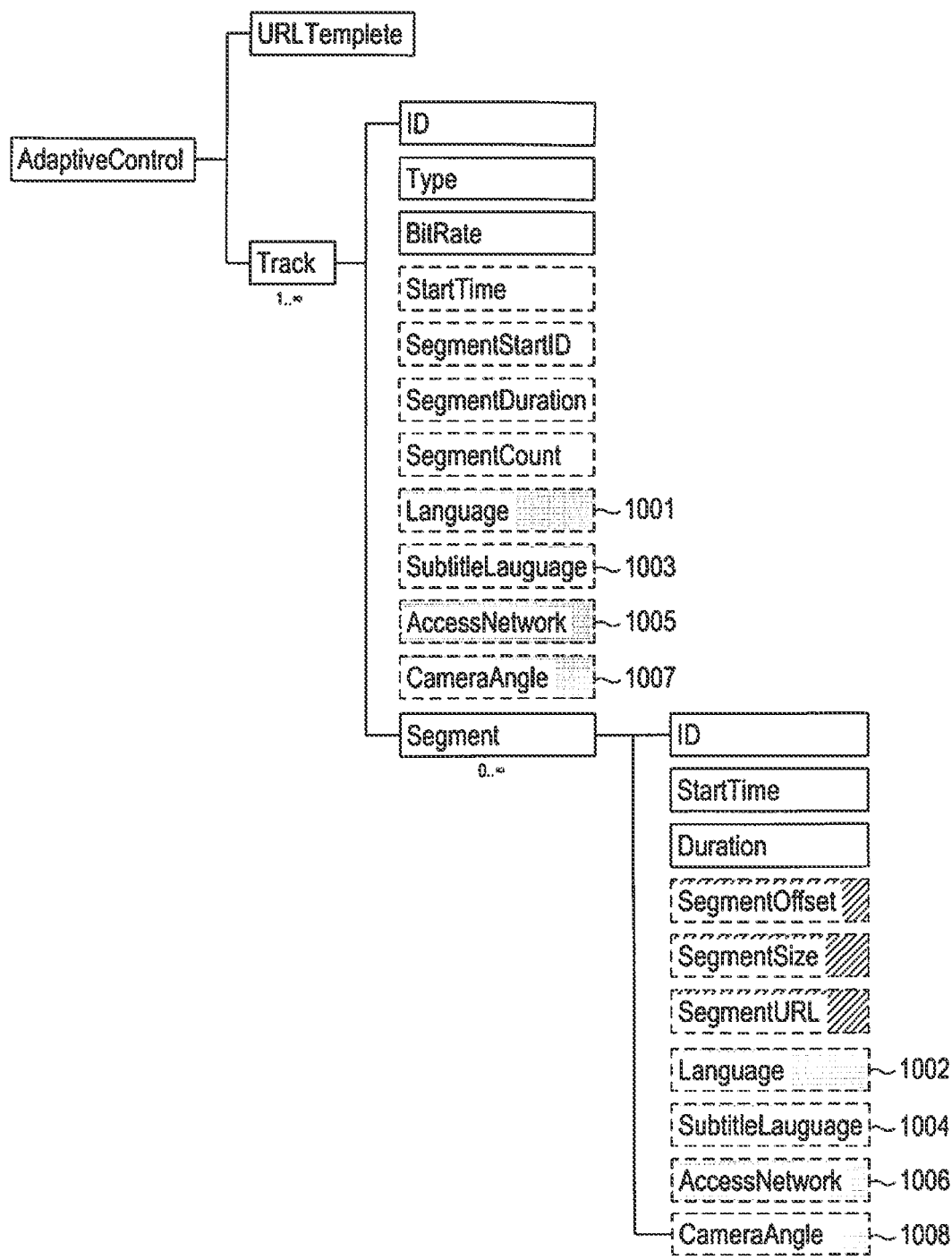
FIG. 10 illustrates an example in which other new fields can be added in the manifest in the file format according to the present invention.

FIG. 10 illustrates an example in which other new fields can be added in the manifest in the file format according to the present invention.

In addition to the new fields described above, other fields can also be used in the manifest.

The field Language 1001 and 1002—Different tracks/segments can provide different languages for the same service. In that case, the language of each track/segment can be indicated in the manifest.

SubtitleLanguage 1003 and 1004—Different tracks/segments can provide different subtitle languages for the same service. In that case, the subtitle language of each track/segment can be indicated in the manifest.

AccessNetwork 1005 and 1006—In the third embodiment of the present invention, AccessNetwork has been described. In a hybrid network, the tracks/segments may come from different networks. Therefore, this information can be indicated in the manifest to help the terminal choose a proper network to access.

CameraAngle 1007 and 1008—Different camera angles can be provided for the same service. The terminal can choose one track/segment with a specific camera angle from the manifest.

Figure 11:
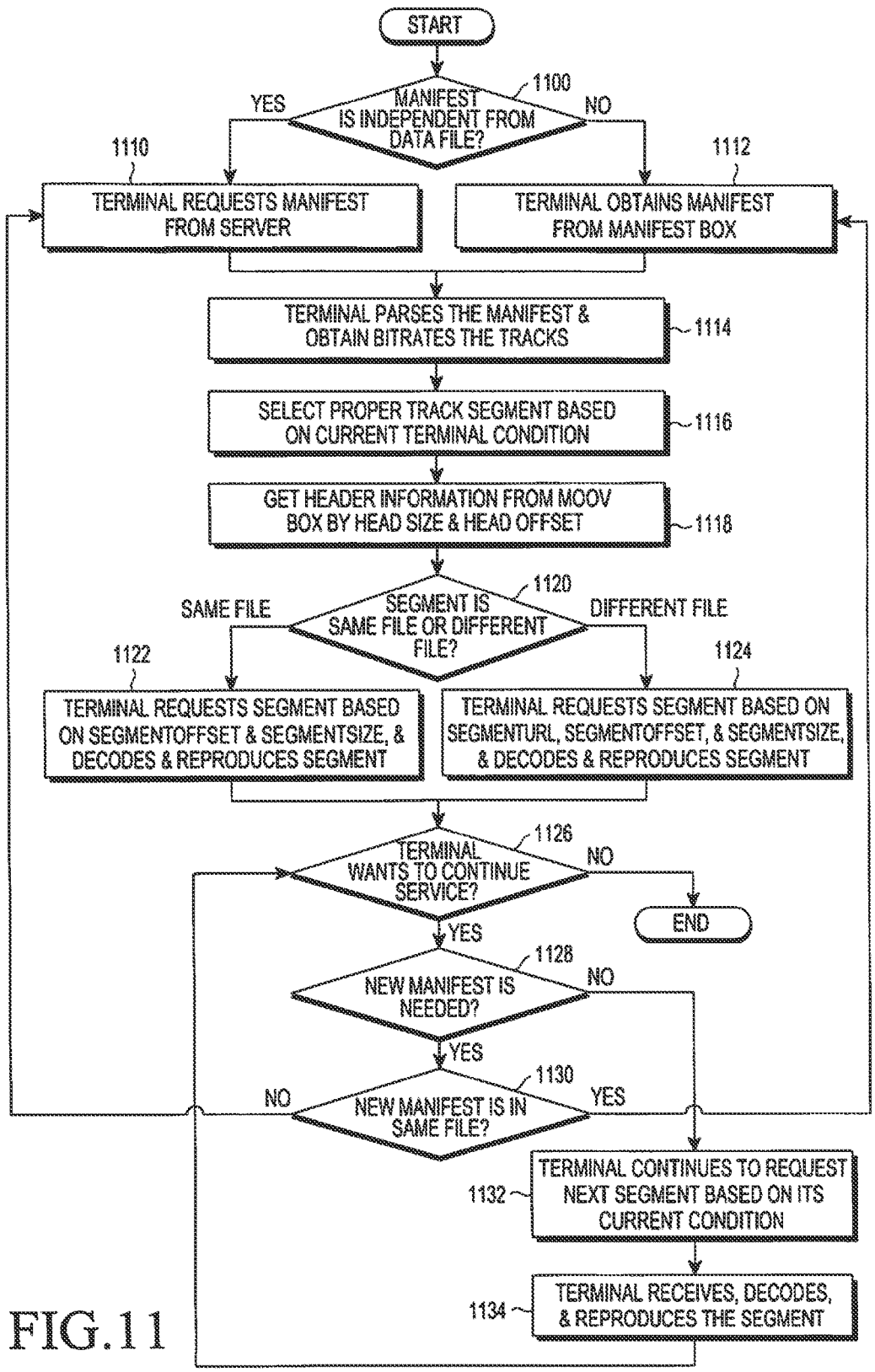
FIG. 11 is a flowchart illustrating a method of reproducing a file by a terminal.

FIG. 11 is a flowchart illustrating a method of reproducing a file by a terminal.

In step 1100, the terminal determines if the manifest is separate from the data file. If the manifest is separate from the data file, the terminal requests and obtains the manifest in step 1110. However, if the manifest is in the same file, the terminal accesses the manifest box and obtains information of the manifest in step 1112.

In step 1114, the terminal parses the manifest to obtain different bitrates of the tracks. In step 1116, the terminal selects a proper track segment based on its current condition.

In step 1118, the terminal can get the header information by parsing the moov box. According to the second embodiment of the present invention, the terminal can access the moov box by using the information relating to the head size and the information relating to the head offset.

Thereafter, in step 1120, the terminal determines if the segment is in the same file or a different file.

When the segment is in the same file, the terminal requests the segment based on the SegmentOffset and SegmentSize attributes, and decodes and reproduces the segment in step 1122.

When the segment is in a different file, the terminal requests the segment based on the SegmentURL, SegmentOffset, and SegmentSize attributes, and decodes and reproduces the segment in step 1124.

After steps 1122 and 1124, the terminal determines if the terminal wants to continue the service instep 1126.

If the terminal does not want to continue the service, the terminal ends the process. If the terminal wants to continue, the terminal proceeds to step 1128.

In step 1128, the terminal determines if a new manifest is needed. If a new manifest is needed, e.g., in the case of live stream, the terminal should obtain the new manifest.

In step 1130, the terminal determines if the new manifest is in the same file. When the new manifest is in the same file, the terminal proceeds to step 1112, in which the terminal obtains the manifest based on the next manifest offset box and next manifest size box. However, as a result of the determination in step 1130, when the new manifest is in a different file, the terminal proceeds to step 1110, in which the terminal acquires the manifest from the server based on the NextAdaptiveControlURL attribute. After getting the new manifest box, the terminal parses and repeats the above steps.

As a result of the determination in step 1128, when a new manifest is not needed, the terminal continues to request the next segment based on its current condition in step 1132, and then receives, decodes, and reproduces the segment in step 1134. The terminal then determines whether the terminal wants to continue the service and repeats the above steps.

The above-described operation of the terminal described above can be applied to all the embodiments of the present invention.

Figure 12:
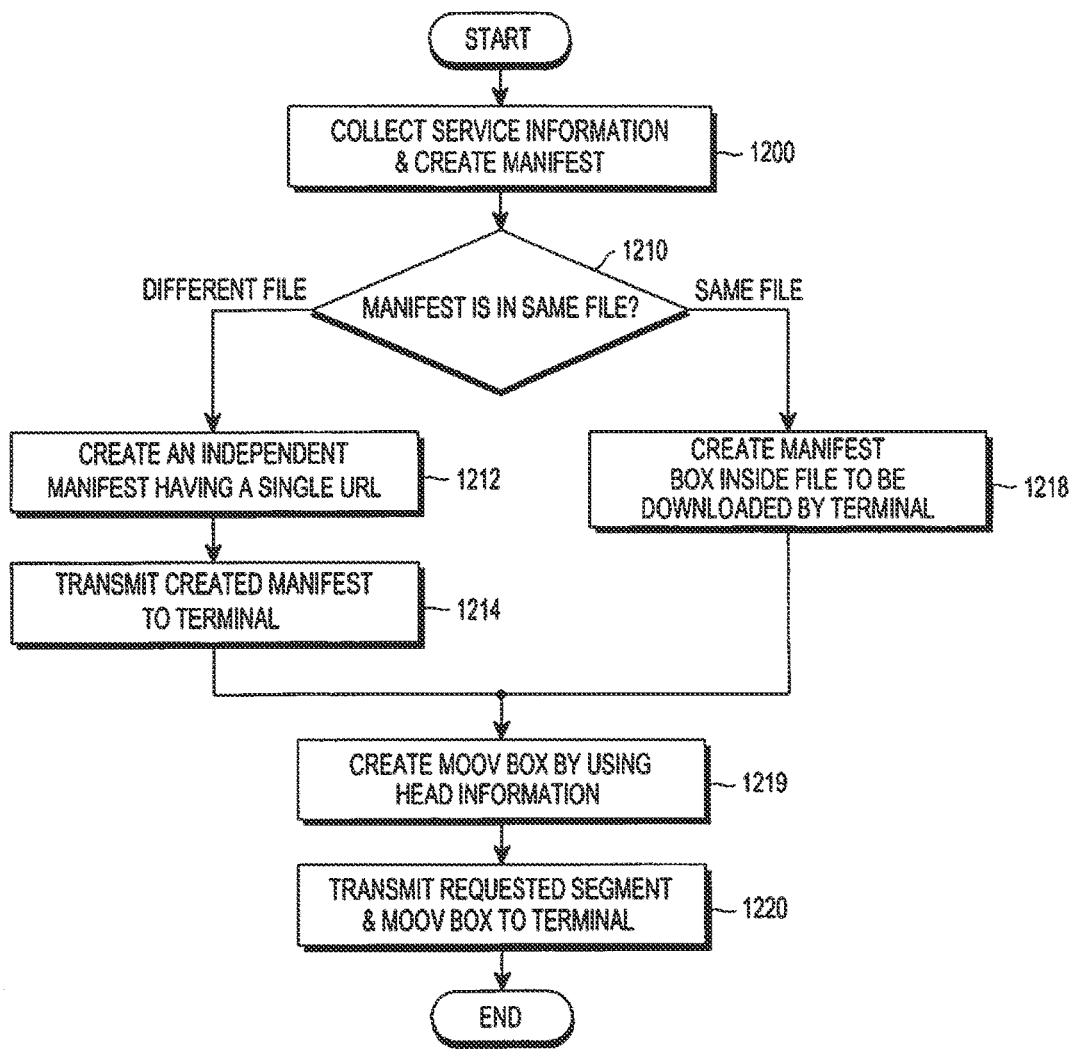
FIG. 12 is a flowchart illustrating the operation of the server.

FIG. 12 is a flowchart illustrating the operation of the server.

In step 1200, the server collects service information to create the manifest.

In step 1210, the server determines whether the manifest is in the same file as that of other service data.

If the manifest is separate, that is, if the manifest is in a file different from that of other service data, the server creates a manifest, which is separate and has a single URL, in step 1212. In step 1214, when the server receives a manifest request from the terminal, the server transmits the manifest created based on the single URL to the terminal.

After parsing the manifest, the terminal requests that the server provide an expected segment.

When the server receives the request for the segment, the server creates a moov box by using head information in step 1219, and transmits the segment requested by the terminal and the moov box to the terminal in step 1220. Thus, upon receiving a segment request from the terminal, the server transmits the expected segment to the terminal.

As a result of the determination in step 1210, if the manifest is in the same file as that of another service data, the server creates the manifest box inside the file in step 1218. The created manifest is then downloaded by the terminal. When the server receives the request for the segment, the server create a moov box by using head information in step 1219, and transmits the segment requested by the terminal and the moov box to the terminal in step 1220. That is, upon receiving a segment request from the terminal, the server transmits the expected segment to the terminal. Otherwise, the manifest box created in step 1218 together with the moov box created in step 1219 and the segment which will be transmitted to the user may be organized into one file, which is then transmitted to the terminal. The operation of the server described above can be applied to all the embodiments of the present invention.

Figure 13:
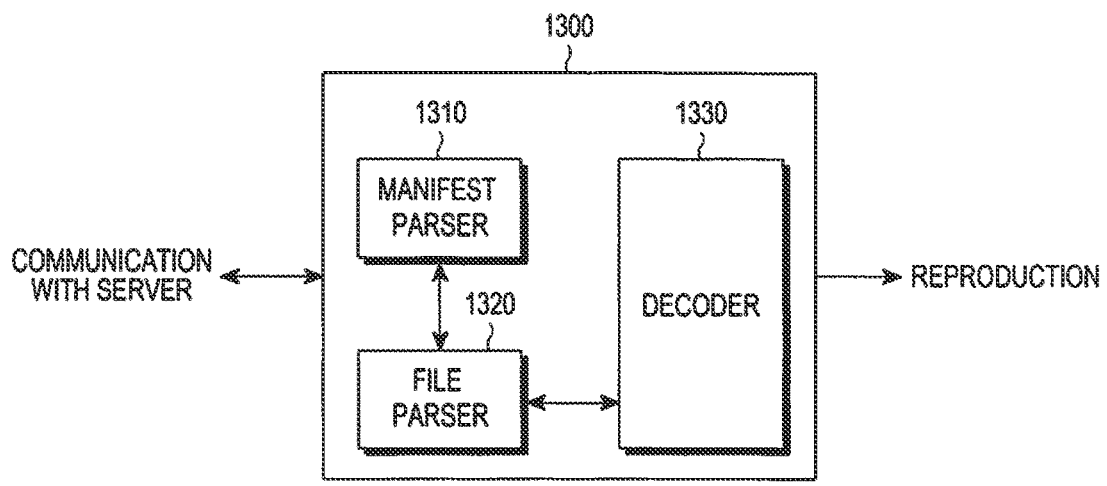
FIG. 13 illustrates block diagram of the terminal.

FIG. 13 is a block diagram of the terminal.

The terminal 1300 includes a manifest parser 1310, a file parser 1320, and a decoder 1330. The terminal 1300, the manifest parser 1310, the file parser 1320, and the decoder 1330 are each embodied as hardware or a combination of hardware and software.

The manifest parser 1310 acquires and parses the manifest if the manifest is separate from the moov box and the media data box. Moreover, the file parser 1320 requests and parses other boxes including the moov box and various other boxes in the segment, other than the manifest box. If the manifest is inside the file, the manifest parser 1310 detects and analyzes the manifest box in the file.

The file parser 1320 analyzes other boxes and mdat in the file. The terminal then requests, decodes, and reproduces the expect segment.

Figure 14:
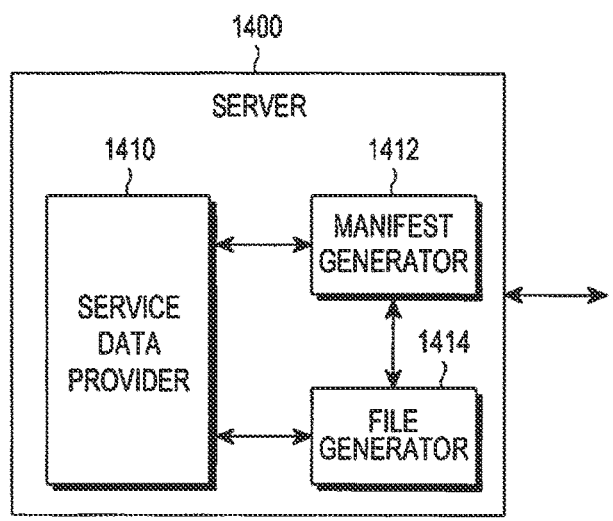
FIG. 14 illustrates block diagram of the server.

FIG. 14 is a block diagram of the server.

The server 1400 includes a service data provider 1410, a manifest generator 1412, and a file generator 1414. The server 1400, the service data provider 1410, the manifest generator 1412, and the file generator 1414 are each embodied as hardware or a combination or hardware and software.

The service data provider 1410 of the server 1400 has all the service sources.

A controller not shown in the drawings receives a manifest request from the terminal and determines if the manifest is separate.

If the manifest is separate from the data file, the manifest generator 1412 creates the manifest information based on service data and some information (e.g., the location of the segment) from the file.

If the manifest is inside the file, the file generator 1414 creates the file such that the manifest box is included in the file. When the manifest is separate from the data file, the file is created to include other files including the moov box and segments, except for the manifest file.

Further, although not shown, it is possible to record, store, and reproduce data according to the file format generated according to an embodiment of the present invention. That is, when the manifest is included in a single file, it is possible to store multiple segments together with the moov box and the mani box within the single file in a storage medium (e.g., CD, DVD, BD, or USB) and to reproduce the segments by first reading and analyzing the mani box. It is also possible to store the manifest in a separate file different from a file for other segments and the moov box and to reproduce a segment including desired data by first reading and analyzing the mani box stored in the separate file. When a storage medium is employed for the storage and reproduction, the URL described above in the embodiments of the present invention can be replaced by storage location information (e.g., a memory address), which can result in easier storage and reproduction.

According to the present invention, it is possible to efficiently transfer, receive, and reproduce Manifest information. Also, according to the present invention, a server can perform an efficient scheduling.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method of transmitting a file in an adaptive streaming system, the method comprising:

generating, by a server, a file related to at least one segment, the at least one segment being decoded based on the file;

transmitting, by the server, the file; and updating the file for a live service, wherein the file includes range information for indicating information about a byte range of the at least one segment, information indicating if the file is to be updated, and start time information indicating a start time of the at least one segment.

2. The method of claim 1, wherein the file further includes location information for the at least one segment.

3. The method of claim 2, wherein the location information is provided as a uniform resource locator (URL).

4. The method of claim 1, wherein the file further includes duration information indicating a duration of the at least one segment.

* * * * *